United States Patent
Cho (10) Patent No.: US 9,516,236 B2
(45) Date of Patent: Dec. 6, 2016

(54) IMAGE PROCESSING METHOD AND DEVICE SYSTEM

(71) Applicant: CANON KABUSHIKI KAISHA, Tokyo (JP)

(72) Inventor: Genki Cho, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/016,008

(22) Filed: Feb. 4, 2016

(65) Prior Publication Data

US 2016/0234429 A1 Aug. 11, 2016

(30) Foreign Application Priority Data

Feb. 9, 2015 (JP) ................................ 2015-023664

(51) Int. Cl.
| | |
|---|---|
| *H04N 5/235* | (2006.01) |
| *B25J 9/16* | (2006.01) |
| *H04N 5/232* | (2006.01) |
| *G06K 9/62* | (2006.01) |
| *H04N 5/262* | (2006.01) |

(52) U.S. Cl.
CPC ........... *H04N 5/2351* (2013.01); *B25J 9/1697* (2013.01); *G06K 9/6202* (2013.01); *H04N 5/23216* (2013.01); *H04N 5/2624* (2013.01); *Y10S 901/09* (2013.01)

(58) Field of Classification Search
CPC .. H04N 5/23229; H04N 5/243; H04N 5/2351; H04N 5/235; B65G 2203/041; G01N 2223/643
See application file for complete search history.

(56) References Cited

U.S. PATENT DOCUMENTS

| | | | | |
|---|---|---|---|---|
| 2010/0103107 | A1* | 4/2010 | Chao | G06F 3/0317 345/166 |
| 2011/0032373 | A1* | 2/2011 | Forutanpour | G11B 27/034 348/222.1 |

FOREIGN PATENT DOCUMENTS

JP 2009139239 A 6/2009

\* cited by examiner

*Primary Examiner* — Nelson D. Hernández Hernández
(74) *Attorney, Agent, or Firm* — Canon U.S.A., Inc. IP Division (57) ABSTRACT

With an image processing method, in response to a control signal from an external device, main imaging is performed by using a predetermined main imaging parameter, main image processing is performed on the acquired image data, a result is sent to a control device, and, during the main image processing, sub-imaging is performed by using at least one sub-imaging parameter, which is different from the main imaging parameter. Sub-image processing is performed on the image data acquired by the sub-imaging, and the result is extracted. If the extracted sub-image processing result falls within a predetermined processing result criteria range, updating is performed by setting, as a new main imaging parameter, the sub-imaging parameter that has generated the processing result.

7 Claims, 9 Drawing Sheets

| SUBJECT | MAIN IMAGING PARAMETER (AMPLIFICATION MAGNIFICATION) | MAIN IMAGE PROCESSING RESULTS | | | | | SUB-IMAGING PARAMETER (GAIN) | SUB-IMAGE PROCESSING RESULTS | | | | |
|---|---|---|---|---|---|---|---|---|---|---|---|---|
| | | DETERMINATION | X-COORDINATE | Y-COORDINATE | θ | SCORE | | DETERMINATION | X-COORDINATE | Y-COORDINATE | θ | SCORE |
| 41 | 1.0 | OK | 100 | 50 | 30 | 0.65 | 2.0 | NG | - | - | - | 0.31 |
| 42 | 1.0 | OK | 200 | 75 | 150 | 0.63 | 1.7 | OK | 201 | 74 | 149 | 0.71 |
| 43 | 1.0 | OK | 75 | 75 | 45 | 0.66 | 1.4 | OK | 74 | 76 | 44 | 0.91 |
| 44 | 1.4 | OK | 100 | 50 | 85 | 0.90 | | | | | | |

UPDATE IMAGING PARAMETER

| SUBJECT | MAIN IMAGING PARAMETER (AMPLIFICATION MAGNIFICATION) | MAIN IMAGE PROCESSING RESULTS | | | | | SUB-IMAGING PARAMETER (GAIN) | SUB-IMAGE PROCESSING RESULTS | | | | |
|---|---|---|---|---|---|---|---|---|---|---|---|---|
| | | DETERMINATION | X-COORDINATE | Y-COORDINATE | θ | SCORE | | DETERMINATION | X-COORDINATE | Y-COORDINATE | θ | SCORE |
| 41 | 1.0 | OK | 100 | 50 | 30 | 0.65 | 2.0 | NG | - | - | - | 0.31 |
| | | | | | | | 1.7 | OK | 101 | 49 | 30 | 0.71 |
| | | | | | | | 1.4 | OK | 101 | 50 | 29 | 0.91 |
| 42 | 1.4 | OK | 100 | 50 | 30 | 0.90 | | | | | | |

UPDATE IMAGING PARAMETER

IMAGE PROCESSING METHOD AND DEVICE SYSTEM

BACKGROUND OF THE INVENTION

Field of the Invention

The present disclosure generally relates to image processing and, more particularly, to an image processing method and a device system for changing an imaging parameter of a camera and capturing an image-to-be-checked and for adjusting the imaging parameter as necessary.

Description of the Related Art

With a widely known image processing method, for example, the presence and absence of an object are determined, and if the presence is determined, an image of the object is captured, image processing is performed, the position and phase of the object are measured, and a surface state is inspected to find a non-defective piece.

With such an image processing method, first, image data is normally acquired having appropriate brightness distribution, color density distribution, brightness gradient, and the like in order to obtain appropriate image processing results. Therefore, it is important to adjust various imaging parameters such as exposure time, amplification of a signal (gain), and aperture size at the time of capturing an image. Even so, appropriate image data is not acquired when the external environment changes, for example, when lighting is degraded over time, when an indoor or outdoor environment changes, or when light is blocked temporarily (e.g., when a human or a device operation generates a shadow). In a case of industrial manufacture, for example, where objects having shapes conforming to predetermined standards are inspected, the quality, shape, or material of surfaces may differ for each piece, which may result in a failure of acquiring appropriate image data.

In a case in which the image processing results include a defect, a user may have to stop the operation of a device and adjust the imaging parameters. Unfortunately, this decreases the operating efficiency of the device.

To overcome the above problem, Japanese Patent Laid-Open No. 2009-139239 discloses a technique of calculating a value of brightness of acquired image data in a predetermined area and determining whether or not the value falls within a predetermined range of brightness values. If the calculated brightness value is not within the predetermined range of brightness values, an imaging parameter is changed and image data is repeatedly acquired until the brightness of the acquired image data in the predetermined area falls within the predetermined range of brightness values.

Image data that is acquired subsequently through such an adjusting step is to be subjected to predetermined image processing by using the adjusted range of brightness values as a new basis. This technique can be used to acquire image data that is appropriate for image processing by determining, even during operation of the device, whether or not the imaging parameter is appropriate on the basis of the brightness value of the image data in the predetermined area and adjusting the imaging parameter directly.

However, with this method for directly adjusting the imaging parameter as disclosed in Japanese Patent Laid-Open No. 2009-139239, image processing is performed after the adjustment of the imaging parameter so that the predetermined brightness value can be obtained. Accordingly, in some cases, the image processing results are not satisfactory.

When the cause of the inappropriate image processing results is poor lighting, it may be impossible to acquire image data of the object having appropriate brightness distribution, thereby producing the inappropriate image processing results. For example, the amount of characteristic information of the object, such as brightness gradient, brightness distribution, or color density distribution, may decrease; the position and phase may be measured with less accuracy; and the presence and absence determination may fail.

Additionally, direct adjustment may lead to user's misadjustment in actual manufacturing sites, which may result in a decrease in the accuracy with which the object is measured, false detection of non-defective pieces as defective pieces, or false detection of defective pieces as non-defective pieces.

The present disclosure has been made in view of the above circumstances and provides an image processing method and a device system in which the operation of a device is less affected by temporary variations of an object or external factors.

SUMMARY OF THE INVENTION

According to an aspect of the present disclosure, an image processing method is provided for performing image processing on a captured image by using a control device, an image processing device, and an imaging device that are capable of communication with each other, the method including acquiring a main captured image by capturing, by using the imaging device, an image of an object by using a predetermined main imaging parameter, and performing, by using the image processing device, main image processing on the main captured image; transmitting, to the control device, a result of the main image processing performed on the main captured image; acquiring a sub-captured image by capturing, by using the imaging device, an image of the object by using a sub-imaging parameter, and performing, by using the image processing device, sub-image processing on the sub-captured image; and comparing the result of the main image processing performed on the main captured image with a result of the sub-image processing performed on the sub-captured image and, if the result of the sub-image processing falls within a predetermined processing result criteria range, performing updating by setting the sub-imaging parameter as a new main imaging parameter, and if the result of the sub-image processing does not fall within the predetermined processing result criteria range, refraining from updating.

Further features of the present disclosure will become apparent from the following description of exemplary embodiments with reference to the attached drawings.

DESCRIPTION OF THE EMBODIMENTS

First Embodiment

An embodiment of the present disclosure is an image processing method for performing image processing on a captured image by using a control device, an image processing device, and an imaging device that are capable of communication with each other. A first embodiment of the present disclosure will be specifically described below with reference to FIG. 1A and FIG. 1B.

First, a process is described in which main imaging is processed by using a main imaging parameter, main image processing is performed, and the processing results (main image processing results) are sent to an external device. Next, sequential steps are described in which sub-imaging is performed during the main image processing by using a sub-imaging parameter and the imaging parameter is checked or adjusted while sub-image processing results are extracted.

Examples of the imaging parameter include exposure time, amplification of a signal (gain), and aperture size at the time of capturing an image.

The following are given as examples in the description: a configuration of the whole device system that uses the image processing method, a purpose of operation, details of image processing, devices to be controlled, processing results, control results, and the like.

Note that it is possible to arbitrarily set the configuration of the whole device system, the operation of the device system, the details of image processing, parameters to be used for processing, the devices to be controlled, and the like, in accordance with the purpose of the whole device system.

It is also possible to provide a device system according to this embodiment using a processing algorithm and program whose parameters can be arbitrarily set by a user of the device system through a user interface, for example.

Figure 1A:
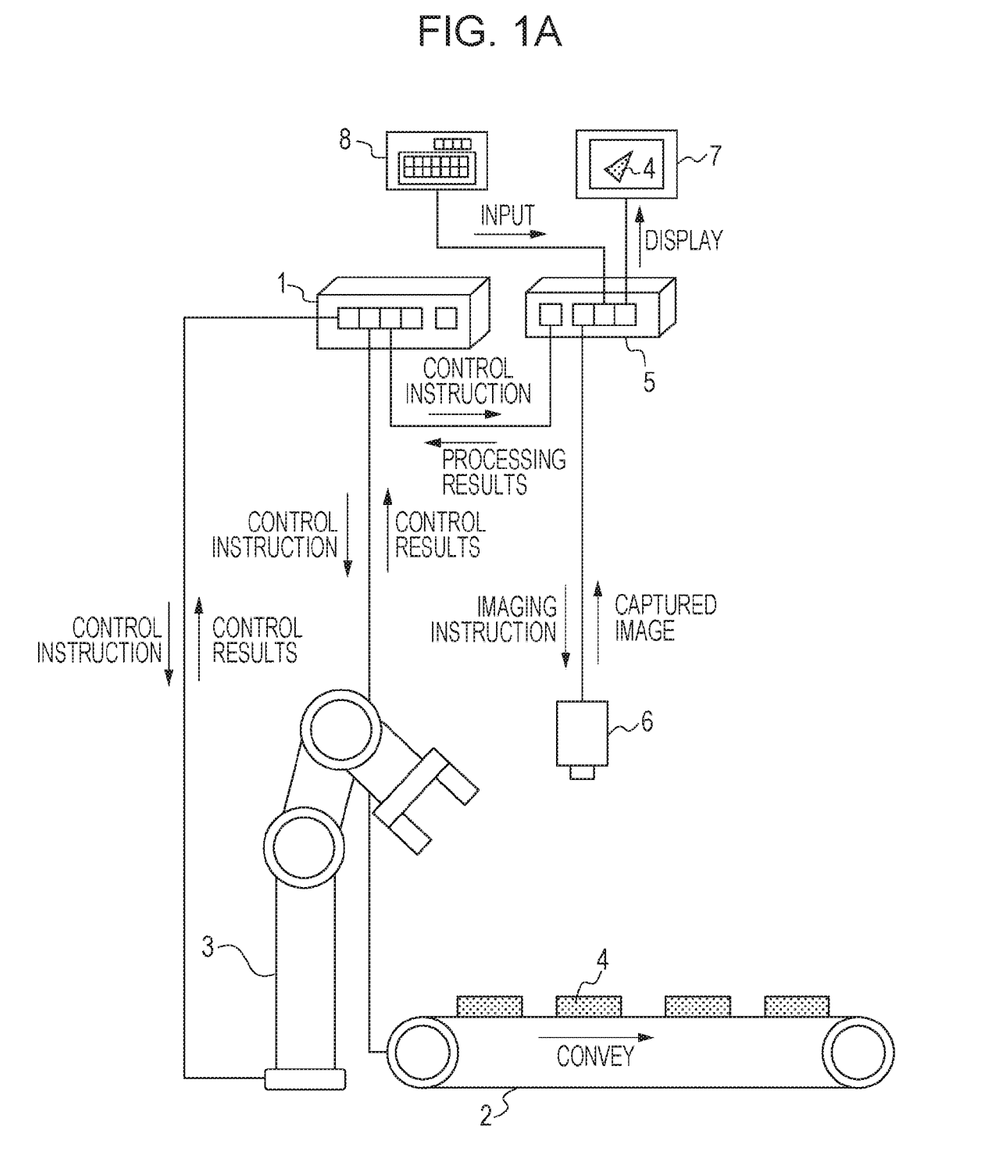
FIG. 1A is a system diagram illustrating the flow of an imaging parameter adjusting process in a case in which an image processing method in a first embodiment of the present disclosure is applied to a distribution device.

FIG. 1A illustrates a device system that uses the image processing method according to an embodiment of the present disclosure, and the device system is configured as a distribution device by combining an image processing device 5 with a control device 1, a conveying device 2, and the like.

The control device 1 is configured to be able to transmit/receive signals to/from the conveying device 2, a robot arm 3, and the image processing device 5. The control device 1 controls these devices and causes predetermined operations to be executed, such as pick and place.

Details, order, timing, and the like of the operations are stored in the control device 1 as programs or are included in a setting file read by a control application.

This device system (distribution device) conveys an object 4 and picks up and arranges the object 4 by using the provided robot arm 3. The control device 1 transmits a control instruction to the image processing device 5 together with operation statuses of the conveying device 2 and the robot arm 3 at an arbitrarily predetermined timing in order to instruct the image processing device 5 to measure an image, for example. That is, the control device 1 generally manages operation timings, instructions, and the like of each device constituting the device system. In response to details of instructions, the conveying device 2, the robot arm 3, the image processing device 5, and the like execute predetermined processing and communicate in such a manner as to send the control results and processing results to the control device 1.

The image processing device 5 is connected to an imaging device 6, a display device 7, and the like. Upon receiving an instruction from the control device 1, the image processing device 5 transmits a signal related to an imaging instruction to the imaging device 6 together with a predetermined imaging parameter, and the imaging device 6 captures an image of the object 4.

The image data acquired by capturing the image is input into the image processing device 5, and image processing is performed. Upon completion of the image processing, the results are sent to the control device 1 and displayed on the display device 7 as necessary. The image processing device 5 may receive a change in the setting at any time in response to an instruction from the control device 1, an input device 8, or the like.

The control device 1 and the image processing device 5 are separately configured in this example, but may also be configured integrally as one system control device, for example. The user may employ any desired configuration as appropriate in order to implement the present disclosure.

Figure 1B:
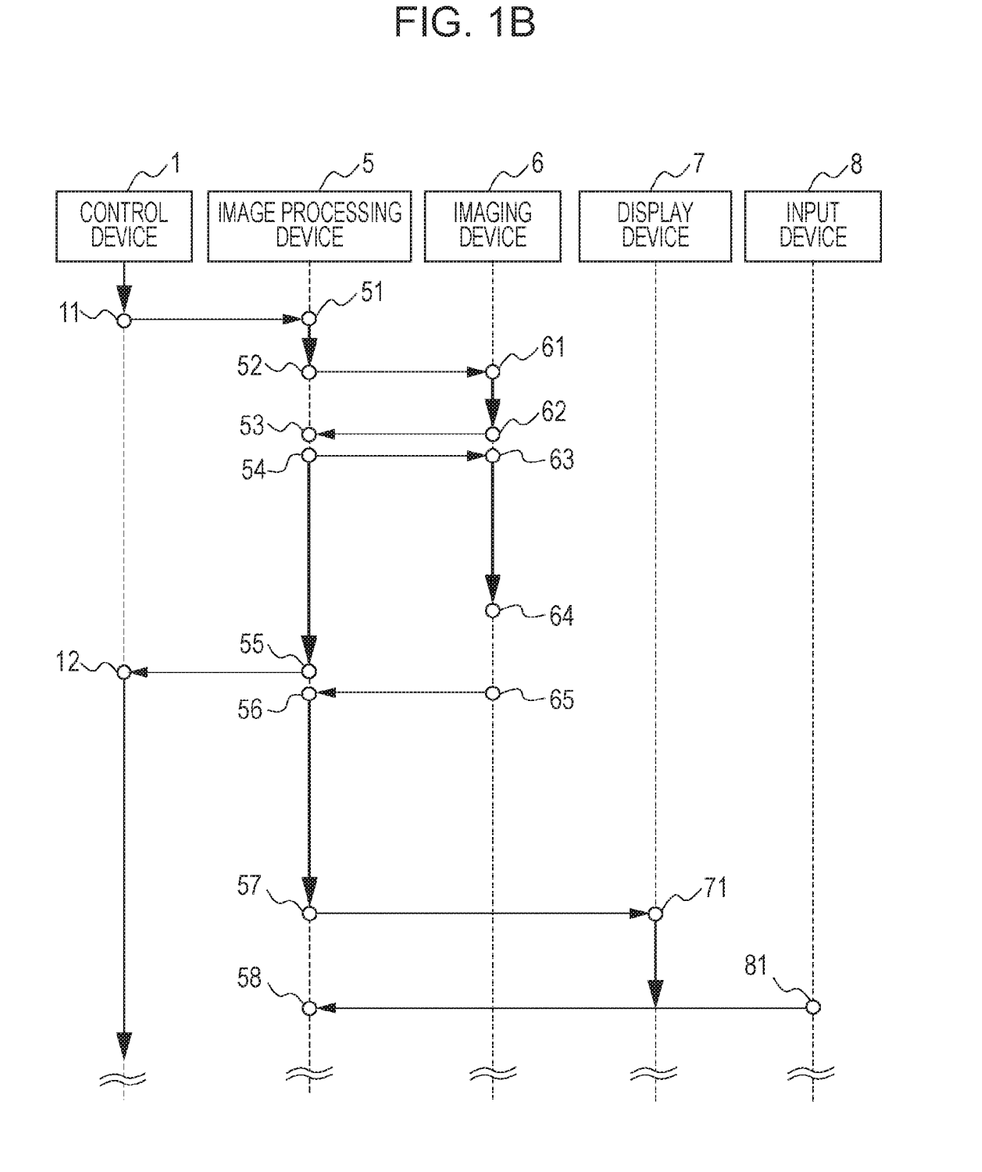
FIG. 1B is a controlling sequence diagram of FIG. 1A.

FIG. 1B is an example of a controlling sequence diagram including a series of controlling steps in the above configuration.

The controlling sequence diagram illustrated in FIG. 1B starts in response to a control instruction transmitted from the control device 1 to the image processing device 5.

The sequence diagram illustrates a process in which the control instruction is transmitted to the image processing device 5, the image processing device 5 receives the control instruction for image processing, sends and displays the processing results, and updating of the imaging parameter is performed, for example.

In the figure, each down arrow represents execution of a process, each left (or right) arrow represents communication control between the devices, and the time and steps proceed toward lower sections.

Note that the time for communication is not illustrated here because it is sufficiently shorter than the time for the other processes. First, at a timing 11 designated in a program, for example, the control device 1 transmits an instruction for image processing to the image processing device 5 by using a communication unit. At a timing 51, the image processing device 5 receives the instruction for image processing and reads various setting files corresponding to the details of the instruction, for example. As used herein, the term "unit" generally refers to any combination of software, firmware, hardware, or other component, such as circuitry, that is used to effectuate a purpose.

Next, at a timing 52, the image processing device 5 transmits an imaging instruction to the imaging device 6 together with a predetermined main imaging parameter. Upon receiving the imaging instruction, the imaging device 6 starts to capture an image (performs main imaging) at a timing 61. Then, at a timing 62 at which the imaging ends, the image processing device 5 receives (downloads) image data stored into an internal storage area of the imaging device 6, for example.

At a timing 53, the image processing device 5 receives (downloads) the image data, and from a timing 54 to a timing 55, the image processing device 5 performs main image processing. Upon the end of the main image processing, the image processing device 5 sends the processing results to the control device 1 at an arbitrary timing (the sending time is normally as short as possible in order not to interrupt the operation of the whole device system). From a timing 12 at which the control device 1 receives the processing results, the control device 1 performs another subsequent process or transmits another control instruction by using the processing results.

The imaging and the image processing method according to an embodiment of the present disclosure as illustrated in FIG. 1B have the following features.

Specifically, at the timing 53, the image processing device 5 receives (downloads) image data that is acquired by the main imaging (hereinafter referred to as main captured image data), and then, the image processing device 5 transmits an imaging instruction to the imaging device 6 together with a sub-imaging parameter, which is different from the main imaging parameter (used from the timing 61 to the timing 62). For example, in FIG. 1B, after receiving the main captured image data, at the timing 54, the image processing device 5 starts the main image processing by using the image data. Concurrently, the image processing device 5 transmits the above imaging instruction to the imaging device 6 together with the sub-imaging parameter, which is different from the main imaging parameter. The imaging device 6 starts sub-imaging at a timing 63 and ends the sub-imaging at a timing 64.

Focusing only on the imaging device 6, imaging is performed twice in total (the main imaging and the sub-imaging), and two pieces of image data having different imaging parameters such as different exposure times are acquired.

Note that the image processing device 5 should postpone a process that delays the operation of the whole device system.

Therefore, as illustrated in FIG. 1B, the image processing device 5 prioritizes sending the main image processing results to the control device 1, and, for example, at a timing 56 after the timing 55 at which the sending of the main image processing results is completed, the image processing device 5 receives (downloads) image data that is acquired by the sub-imaging (hereinafter referred to as sub-captured image data). After that, the image processing device 5 performs, on the sub-captured image data, image processing (sub-image processing) that is substantially the same as the main image processing performed earlier, i.e., from the timing 54 to the timing 55.

At a timing 57 at which the processing on the sub-captured image data is completed, the sub-image processing results may be output, for example, to the display device 7 and displayed thereon (at this timing 57, the main image processing results may be transmitted together from the image processing device 5 to the display device 7). If the output sub-image processing results are satisfactory and fall within a predetermined processing result criteria range, at a timing 81, for example, the imaging parameter that is used in the image processing device 5 may be updated by using the input device 8. That is, the imaging parameter can be adjusted by performing updating by setting the sub-imaging parameter as a new main imaging parameter, and the new main imaging parameter can be used for the next and subsequent main imaging. As referred to herein, the processing result criteria range in which the operation of a device is less affected by temporary variations of an object or external factors, for example, may be based, in part, on image data having appropriate brightness distribution, color density distribution, brightness gradient, and the like in order to obtain appropriate image processing results. Therefore, it is important to adjust various imaging parameters such as exposure time, amplification of a signal (gain), and aperture size at the time of capturing an image. Even so, appropriate image data is not acquired when the external environment changes, for example, when lighting is degraded over time, when an indoor or outdoor environment changes, or when light is blocked temporarily (e.g., when a human or a device operation generates a shadow). In a case of industrial manufacture, for example, where objects having shapes conforming to predetermined standards are inspected, the quality, shape, or material of surfaces may differ for each piece, which may result in a failure of acquiring appropriate image data.

If the satisfactory image processing results that fall within a predetermined processing result criteria range are not obtained, subsequently, the image processing device 5 may wait for a control instruction from the control device 1, for example, and the imaging parameter may be checked while the sub-imaging parameter is changed in substantially the same manner in the next and subsequent image processing.

Figure 2:
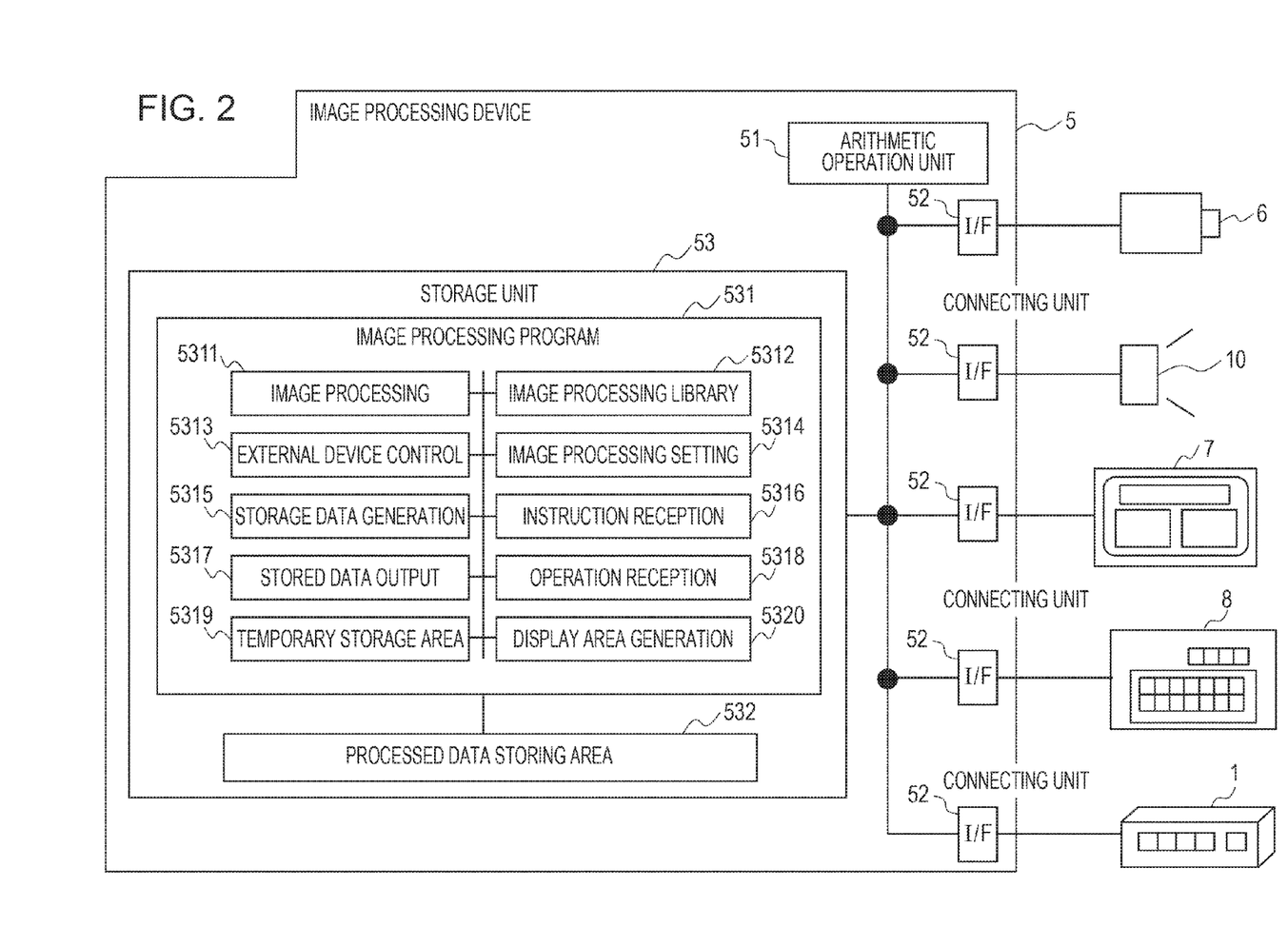
FIG. 2 is a block diagram illustrating a configuration of an image processing device that uses the image processing method according to the first embodiment of the present disclosure.

FIG. 2 illustrates an example of a configuration of the image processing device 5 that can perform the image processing and adjust the imaging parameter according to this embodiment. The image processing device 5 illustrated in FIG. 1A and FIG. 2 includes the display device 7 including a cathode tube, a liquid crystal panel, and the like in order to display images, and the input device 8. Examples of the input device 8 include devices for various operation inputs, such as a keyboard, mouse, touch screen, input operation controller, gesture input device, and the like. Mainly the display device 7 and the input device 8 constitute a user interface.

The image processing device 5 is connected to the imaging device 6 formed of a digital camera, for example, as a unit for inputting the image data. In addition, although not illustrated in FIG. 1A, as necessary, it is also possible to additionally provide a lighting device 10 in order to capture images, such as a lighting device including a halogen lamp, a light-emitting diode, or the like, and to connect an external storage device in order to increase a storage area. The image processing device 5 is further connected to the control device 1 via a network, cable, or the like. The above units are connected through interfaces 52 disposed on an internal bus of the image processing device 5. Each interface 52 conforms to a standard that is appropriate for communication of the above units. Each interface 52 is formed of, for example, a network interface or a serial communication interface, depending on a target of connection to be used.

The image processing device 5 includes, as a control device that mainly performs the image processing, a central processing unit (CPU) element that is a generic microprocessor and an arithmetic operation unit 51 that is a processor for image processing, for example. The arithmetic operation unit 51 is connected to a storage unit 53 illustrated in the left of FIG. 2 via the internal bus (e.g., a data bus, an address bus, or another control line) of the image processing device 5. The storage unit 53 may be a file area or a virtual storage area on a nonvolatile memory device (e.g., read-only memory (ROM), random access memory (RAM), erasable programmable read-only memory (EPROM), or electrically erasable programmable read-only memory (EEPROM)) or an external storage device (e.g., a storage device including an HDD (hard disk drive) or a semiconductor element (not illustrated) or an external storage device that can be connected to a connection unit 52).

A processed data storing area 532 of the storage unit 53 is a RAM area of the storage unit 53, a file area or a virtual storage area on an external storage device, or the like. The processed data storing area 532 temporarily stores processed data and also stores setting parameters for the image processing and the like. When the image data is logged into an external storage device, the processed data storing area 532 is used as a data cache of the external storage device, for example.

Further, the storage unit 53 stores an image processing program 531 for performing the image processing according to this embodiment. The image processing program 531 changes the setting for the image processing and performs the image processing in response to operations performed on the input device 8, for example. The image processing program 531 can also store or delete the changed details of the setting for the image processing in or from the processed data storing area 532.

The image processing program 531 is software implementing the following functions, for example. First, image processing 5311 is a main part of the image processing program for performing the image processing that will be described later. The image processing 5311 is performed by using an image processing library 5312. The image processing library 5312 is installed in the storage unit 53 as a statically or dynamically linked library, for example. A program for image processing setting 5314, which determines the behavior of the image processing program 531, is executed in response to operations performed on the input device 8, for example.

The image processing program 531 also includes an I/O (input/output) routine that implements the following functions. The functions are installed in the storage unit 53 in the form of an application (utility) program or a subroutine configured as a statically or dynamically linked library, for example.

The image processing device 5 may execute a program for an external device control 5313 in the image processing program 531, thereby controlling the imaging device 6 and the lighting device 10 and performing the image processing by using the arithmetic operation unit 51 of the image processing device 5. In addition, the image processing device 5 may execute a program for instruction reception 5316, thereby receiving a user operation through the input device 8 (operation reception 5318) or receiving an instruction from the external control device 1, for example. In response to such operations and instructions, the arithmetic operation unit 51 may call the above functions and library of the image processing program 531, thereby performing various kinds of arithmetic operation processing and transmitting the image processing results to the control device 1. In addition, the execution of a program for storage data generation 5315 may cause the external storage device to accumulate (log) the image processing results, for example. Furthermore, programs for stored data output 5317 and display area generation 5320 may be executed, thereby synthesizing, as a screen, a screen configuration that is stored in advance as a program and the image processing results, and displaying the screen on the display device 7.

Figure 3:
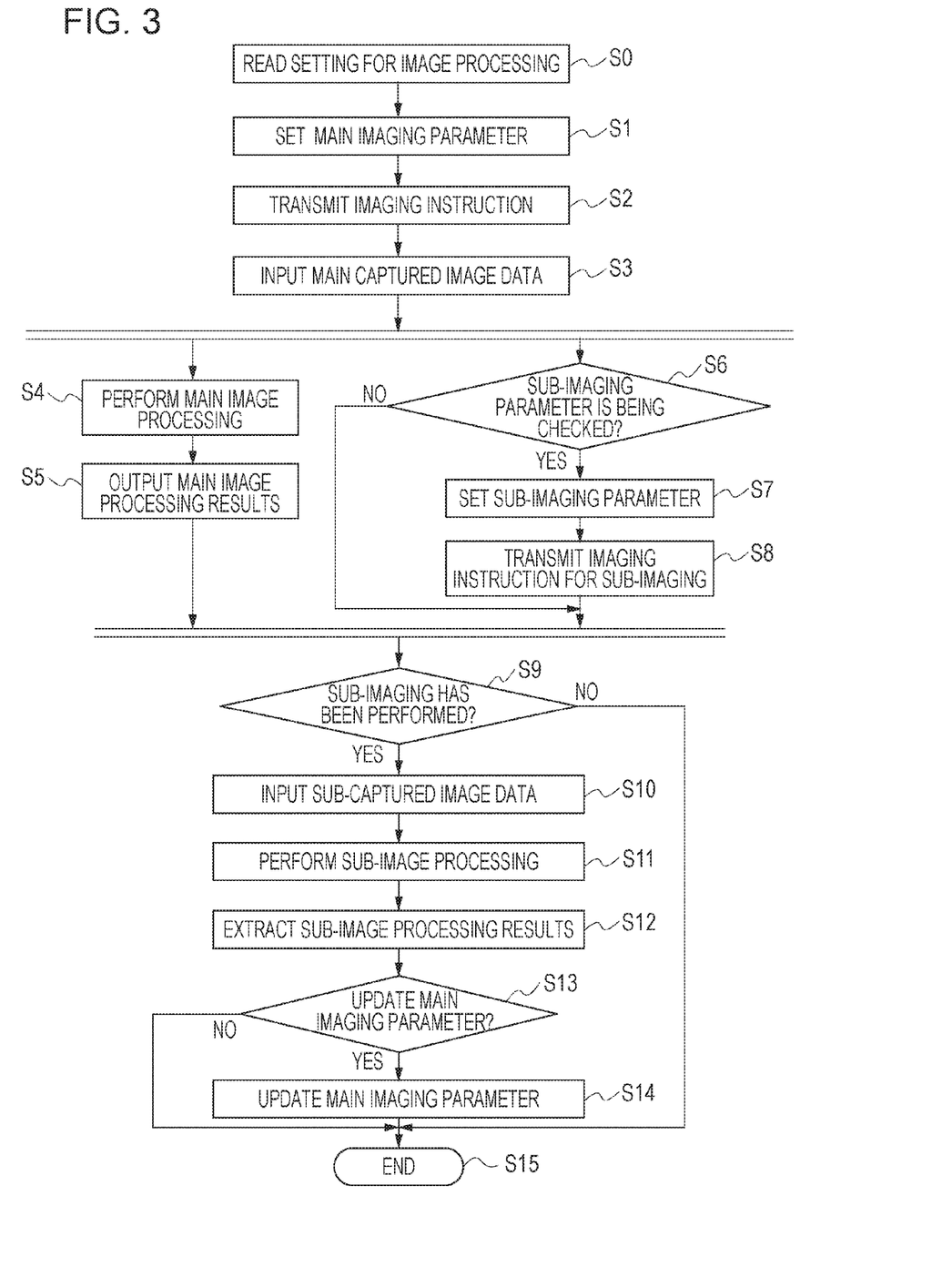
FIG. 3 is a flowchart of a program that adjusts an imaging parameter in the first embodiment of the present disclosure.

Next, a process flow is described in which, during operation of devices, the image processing program 531 adjusts the imaging parameter for capturing an image with reference to the flowchart in FIG. 3. For easy description, the following shows specific but limited details of the image processing, processing results, method for adjusting the imaging parameter, input operation, method for display output, configurations of the devices, and the like.

The details of the image processing, imaging parameter to be adjusted, method for adjusting the imaging parameter, adjustment timing, and the like may be arbitrarily set by a user through a setting screen or may be dynamically determined by using another processing algorithm. The following description assumes that the imaging parameter to be adjusted is a magnification relative to an initial gain used for the main imaging (for example, when the magnification is 1.0, the parameter is 1.0 time the initial gain of the main imaging parameter (the magnification is hereinafter referred to as amplification magnification)).

Since this embodiment can be implemented with a common controllable configuration, the embodiment can be applied as appropriate to anything related to imaging conditions including exposure time, aperture size, focus, and illuminance of a lighting device.

First, in step S0, setting data for the image processing stored in the storage unit 53 is input into a temporary storage area (not illustrated) by executing a program for a temporary storage area 5319. This step corresponds to an operation of reading the setting for the image processing.

The setting data for the image processing contains the imaging parameter used by the imaging device 6 in order to capture an image in the corresponding image processing and illuminance (or setting for switching on and off) of the lighting device 10. The data also contains the number of regions to be subjected to the image processing, position, size, and shape of the regions, details of processing such as pattern matching, edge detection, calculation of brightness distribution, and numerical parameters used for processing. In the following description, pattern information detected from the object having certain information (such search pattern information may be information on brightness gradient or coordinates, information on brightness distribution, or a combination thereof) is registered in advance.

In step S1, the main imaging parameter is set for the imaging device 6. The main imaging parameter is set in advance in the setting data that is read in step S0. The start of measurement including imaging may be triggered by the above described control device 1 or by a user using the input device 8 at an arbitrary timing, for example. In step S2, an imaging instruction is transmitted to the imaging device 6 together with the main imaging parameter set in step S1. In step S3, after the imaging device 6 completes capturing of an image, the acquired main captured image data is input (downloaded) into the image processing program 531. In step S4, in accordance with the details of image processing designated in step S0, main image processing is performed by using the main captured image data.

In step S4 in which the main image processing is performed, a pattern matching process is performed in order to search the acquired image data for similar pieces of pattern information.

Specifically, first, matching is performed between a search pattern and the image data, and matching ratios of information such as coordinates (X, Y) of the position where the object is detected, a phase (θ) of the object, and the like are output as matching scores. Hereinafter, such a matching ratio of search pattern information is referred to as a matching score or simply as a score. The image processing device 5 performs the pattern matching process in such a manner as to output the matching score in a range between 0 and 1.0, and the results may be sent to the control device 1 or may be displayed on the display device 7.

In step S5, the main image processing results are output.

In steps S6, S7, and S8, processes related to the sub-imaging parameter are performed concurrently with step S4. Depending on the configuration of the arithmetic operation unit 51, steps S6 to S8 may be sequentially performed between step S3 and step S4. In step S6, it is determined whether or not a checking process is performed by using the sub-imaging parameter. For example, if the image processing program 531 is adjusting the imaging parameter, the process proceeds to step S7; if the adjustment is unnecessary, the subsequent steps are skipped and the process ends.

In step S7, the sub-imaging parameter is set for the imaging device 6. Note that the user may directly set the sub-imaging parameter in the form of a graphical user interface (GUI) through the display device 7 or the input device 8, for example, or it is possible to set an adjusted value obtained by using a prepared table for adjustment, for example.

In step S8, by using the sub-imaging parameter set in step S7, an imaging instruction is transmitted to the imaging device 6. On the basis of the given instruction, the sub-imaging is performed.

In step S9, it is determined whether or not the main image processing results have been output and the sub-imaging has been performed (or has not been checked). If the output of the main image processing results has been completed and the sub-imaging has been performed, the process proceeds to step S10. If the sub-imaging has not been performed, the subsequent steps are determined to be unnecessary, and the process proceeds to step S15, which is a final step.

In step S10, after the imaging device 6 completes capturing of an image, the acquired sub-captured image data is input (downloaded) into the image processing program 531.

In step S11, in accordance with the details of the image processing designated in step S0, the sub-image processing is performed by using the sub-captured image data.

In step S12, the sub-image processing results are extracted. As described above, the position, phase, and matching score as the pattern search results may be displayed on the display device 7 or may be separately transmitted to a determination program by the image processing program 531, for example. When the control protocol of the device allows an external device such as the control device 1 to perform determination, the sub-image processing results may be transmitted to the external device.

In step S13, it is determined whether or not to update the main imaging parameter. In a case in which the method for extracting the sub-image processing results is a method for displaying the results on the display device 7, the user checks the displayed results and decides if updating is to be performed or not. Alternatively, it is possible to prepare a program that determines whether or not to update the imaging parameter depending on a predetermined target value or acceptable values of the matching score and to perform determination by executing the program. In addition, with the control device 1 that performs determination as described above, the result of the determination by the control device 1 may be received. It is also possible to set conditions for updating the imaging parameter such that the imaging parameter is updated only when satisfactory image processing results that fall within a predetermined processing result criteria range are obtained a predetermined number of times or more. Alternatively, it is possible to include a mechanism for excluding the extracted image processing results from reference values of the imaging parameter if the image processing results (e.g., the position and phase) do not fall within predetermined ranges or predetermined score ranges. If such a determination method determines to update the main imaging parameter with the sub-imaging parameter, the process proceeds to step S14; if not, the process proceeds to step S15, which is a final step.

In step S14, updating is performed by setting the sub-imaging parameter as a new main imaging parameter. Specifically, the value of the main imaging parameter retained in the image processing program is overwritten by that of the sub-imaging parameter. It is possible to concurrently overwrite the setting data stored in the storage area that is read in step S0 and to update a parameter retained by the imaging device 6, for example.

In step S15, the adjusting process ends. The image processing may end by making available the temporary storage area that is no longer necessary, or reusable data may be retained and the process may return to step S0 or S1 and wait for an instruction for image processing again.

In the above manner, first, the results of the image processing performed on the main captured image are transmitted to the control device, the imaging device captures an image of the object by using the sub-imaging parameter thereby acquiring the sub-captured image, and the image processing device performs the image processing on the sub-captured image.

Then, the results of the image processing performed on the main captured image and the results of the image processing performed on the sub-captured image are compared with each other. If the sub-image processing results are satisfactory and fall within a predetermined processing result criteria range, updating is performed by setting the sub-imaging parameter as a new main imaging parameter; if the sub-image processing results are not satisfactory and do not fall within a predetermined processing result criteria range, updating is not performed.

According to this embodiment, the sub-image processing results are extracted, and if the processing results are satisfactory and fall within a predetermined processing result criteria range, the main imaging parameter is updated. Thus, adverse effects are suppressed, such as stopping the operation of the devices and causing a malfunction or damage as a result of false main image processing due to misadjustment of the imaging parameter.

Figure 4:
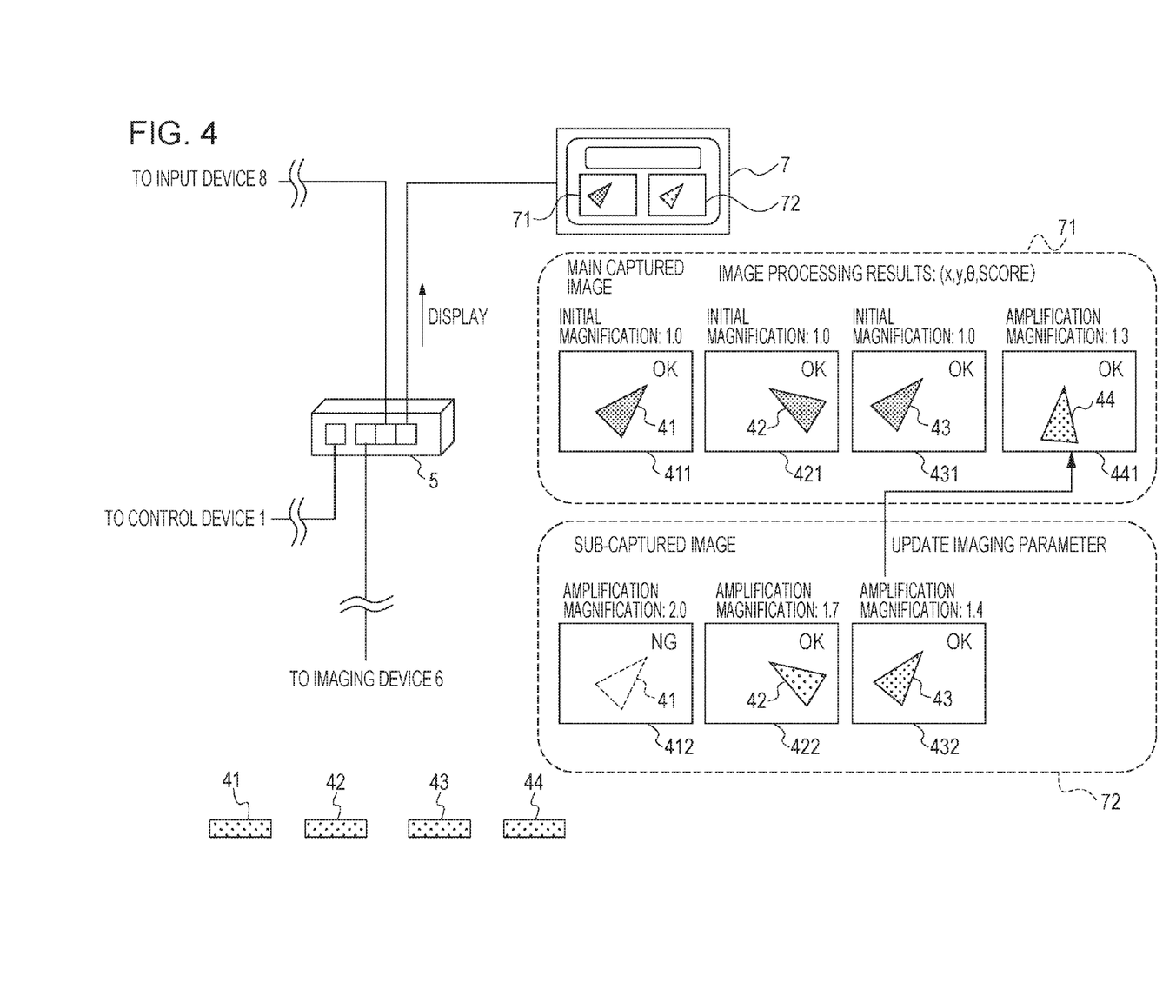
FIG. 4 illustrates an operation of the image processing device of adjusting an imaging parameter in the first embodiment of the present disclosure.

FIG. 4 illustrates an operation of the image processing device performed when the imaging parameter is adjusted in the first embodiment of the present disclosure.

Figure 5:
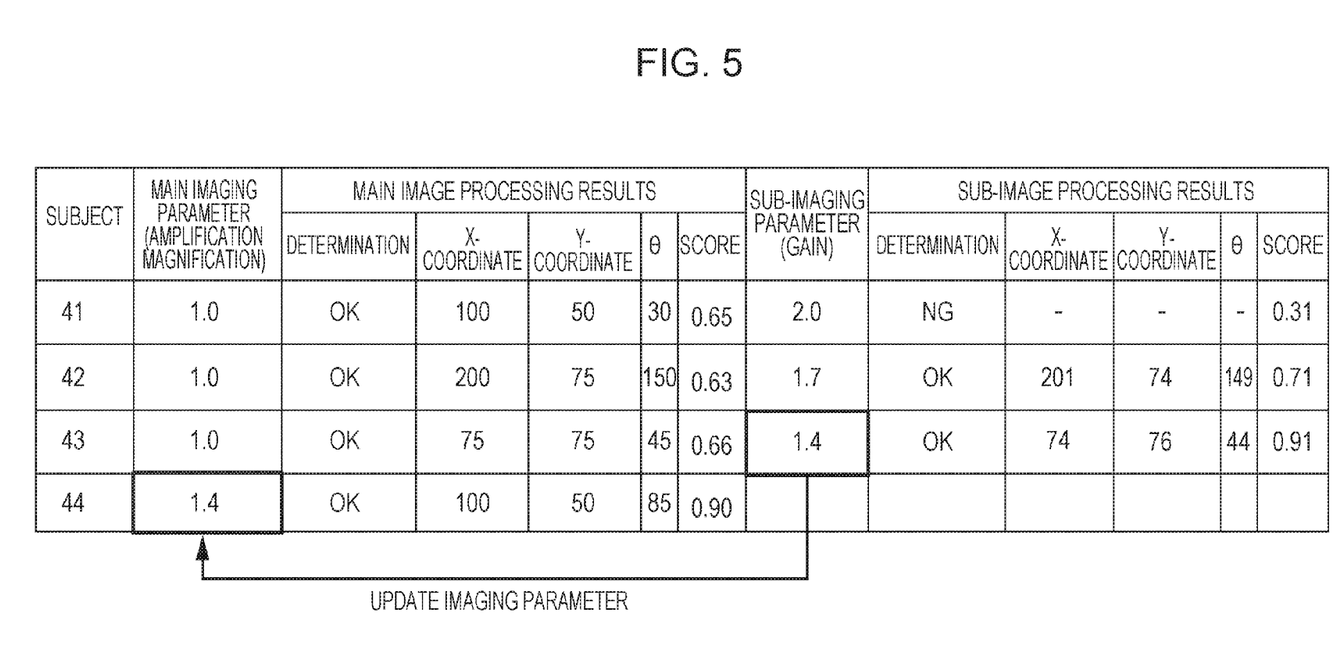
FIG. 5 illustrates image processing results and updating of an imaging parameter in order to adjust the imaging parameter in the first embodiment of the present disclosure.

FIG. 5 is a table illustrating image processing results that are obtained when the imaging parameter is adjusted and updating of the imaging parameter in the first embodiment of the present disclosure.

FIG. 5 illustrates, by using example numerical values, relationships between the image processing results and the updating of the imaging parameter. Advantageous effects of the first embodiment in a specific scene will be described with reference to FIG. 5.

FIG. 4 illustrates output images of the main captured image and the sub-captured image acquired by capturing images of objects 41, 42, 43, and 44 (having the same size and standard). Other components that are identical with those illustrated specifically in FIG. 1A are denoted by the same reference numerals, and illustrations and descriptions of parts of such components are omitted. The control is performed in the same manner as that of the flow in FIG. 3.

Other than the values obtained by pattern matching as the image processing, the user may use values obtained by edge detection, detection of position, phase, size, area obtained by threshold binarization, brightness information and color information of a predetermined area, and the like.

Different kinds of image processing may be performed in a plurality of areas.

For easy description, as in the process flow described with reference to FIG. 3, the imaging parameter to be adjusted is assumed to be only an amplification magnification of an initial gain (initial main imaging parameter). In fact, however, various imaging parameters other than the amplification magnification of the gain may be adjusted.

In this example, if the pattern matching score is greater than or equal to a threshold of 0.6, the determination is successful (indicated as OK); if the score is less than the threshold, the determination is unsuccessful (indicated as no good (NG)).

By using a pattern matching method, the image data is searched, and the search results including position coordinates (X, Y), phase (θ), a pattern matching score, and a result of determination obtained by using the score are output to the control device 1.

Although the threshold of the pattern matching score is 0.6, values almost equal to the threshold are not used for operation. The initial setting defines that a stable operation is possible with pattern matching scores of greater than or equal to 0.8.

Referring now to FIG. 5, the object 41 has a matching score of 0.65. In this case, the main image processing itself is successful, but the user's target value (the matching score of 0.8 in this example) is not obtained.

Referring back to FIG. 4, when the user checks a main captured image 411 and the processing results on, for example, a screen 71 displayed by the display device 7, the user will understand that the image of the object 41 was not captured with appropriate brightness and will recognize the necessity to adjust the imaging parameter. Accordingly, the user increases the amplification magnification of the sub-imaging parameter to 2.0, for example, and captures an image during the main image processing, thereby acquiring a sub-captured image 412. After that, the sub-captured image 412 is subjected to substantially the same image processing as the main image processing (this image processing is referred to as sub-image processing), and the results are displayed on a screen 72. This processing corresponds to the main image processing results and the sub-image processing results of the object 41 in FIG. 5.

However, since the amplification magnification becomes excessively high, the image of the object 41 saturates in the sub-captured image 412, and the sub-image processing including pattern matching fails (determination: NG).

In this embodiment of the present disclosure, as described above, the main imaging parameter is not adjusted immediately in this event in order to send the adjusted main imaging parameter to the control device 1. Accordingly, the main image processing results (the results of the main image processing performed on the object 41 in FIG. 5) are sent, and the device continues to operate without stopping. The control device 1 receives the processing results and transmits a control instruction to the image processing device 5 such that the object 41 is further conveyed and then the object 42 is measured. In this event, when the sub-imaging is performed by setting the amplification magnification of the sub-imaging parameter to 1.7, a sub-captured image 422 is acquired. Thus, the sub-image processing is successful (the determination is OK), and the position and phase of the object 42 are substantially the same as those in the main image processing. However, referring to the row of the object 42 in FIG. 5, the pattern matching score thereof does not reach the target value (0.80). Therefore, the user will continue the adjustment.

The control device 1 transmits a control instruction to the image processing device 5 such that the object 42 is further conveyed and the object 43 is measured. In this case, when the amplification magnification of the sub-imaging parameter is set to 1.4, a sub-captured image 432 is acquired. Thus, the sub-image processing is successful (the determination is OK), and the position and phase of the object 43 are substantially the same as those in the main image processing. In addition, the pattern matching score thereof is 0.91, which is greater than the target value (0.8). Therefore, updating is performed by setting the imaging parameter obtained in this sub-image processing as a new main imaging parameter.

The object 43 is further conveyed, and then an image of the object 44 is captured. In this event, the image processing device 5 captures the image with an amplification magnification of 1.4, which is the new main imaging parameter.

As a result, a main captured image 441 is acquired. Thus, the main image processing is successful, and the pattern matching score of the object 44 is substantially the same as that in the last-checking.

An embodiment of the present disclosure makes it possible to capture an image with the sub-imaging parameter, which is different from the main imaging parameter, during the main image processing, and to extract and check the results of the image processing performed on the image.

Therefore, the imaging parameter can be checked and adjusted at any time in order to obtain an appropriate imaging parameter, without producing adverse effects of stopping the operation of the devices and causing a malfunction or damage as a result of false main image processing due to misadjustment of the imaging parameter.

This embodiment is also useful in a case in which defective objects (defective workpieces in terms of material, shape, and the like) are mixed and in which alignment of the objects varies markedly. In such a case, sub-image processing results extracted from these workpieces are negligible and excluded from pieces to be checked; thus, it is possible to prevent excessive adjustment and misadjustment of the imaging parameter, which adversely affect the devices.

The imaging parameter can be adjusted during operation of the devices, thereby eliminating the necessity to adjust the imaging parameter by stopping the operation of the devices.

After the sub-imaging is performed during the main image processing and the main image processing results are sent to an external device, the sub-image processing may be performed and the results may be extracted. Therefore, it is also possible to check and adjust the sub-imaging parameter without producing adverse effects such as delaying the main image processing.

In addition, it is possible to extract and check the sub-image processing results based on the sub-imaging parameter that is being checked while the image processing results based on the main imaging parameter are sent to the external device. Therefore, in the external device, it is possible to prevent adverse effects produced by humans, such as a defect in the adjustment algorithm of the imaging parameter, misoperation of the user interface, and misadjustment caused by a less-experienced user during the adjusting operation of the imaging parameter.

Second Embodiment

Figure 6:
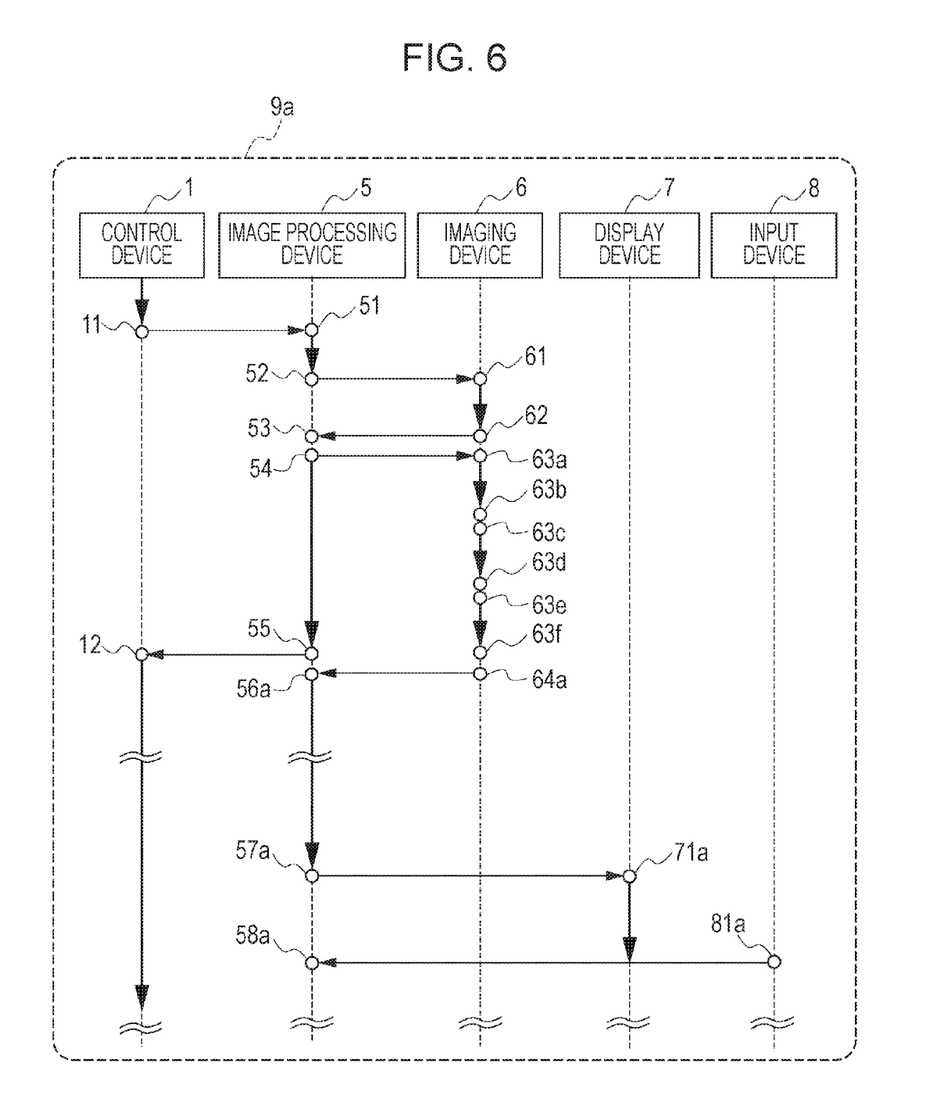
FIG. 6 is a controlling sequence diagram illustrating a process flow of adjusting an imaging parameter when a distribution device uses an image processing method according to a second embodiment of the present disclosure.

Next, with reference to FIG. 6, a step of adjusting the main imaging parameter is described in which a plurality of sub-imaging parameters are compared and checked, which is a feature of a second embodiment of the present disclosure, in order to update the main imaging parameter. In this embodiment, a plurality of pieces of sub-captured image data are each acquired by using a corresponding one of the plurality of sub-imaging parameters. The second embodiment also has features in a step of sub-image group acquisition step of acquiring a group of pieces of sub-captured image data and a sub-image processing step of performing the sub-image processing on the acquired group of pieces of sub-captured image data and extracting the process results.

From among the plurality of sub-imaging parameters, a main imaging parameter is selected in order to adjust the main imaging parameter to be updated.

The second embodiment is substantially the same as the first embodiment except for the above point, and therefore descriptions of the same components are omitted.

FIG. 6 illustrates a controlling sequence according to the second embodiment. As in the first embodiment, the control device 1 transmits control instructions to devices, and depending on destinations and details of the instructions, the conveying device 2, the robot arm 3, the image processing device 5, and the like perform predetermined processing, and then, the control results and processing results are sent to the control device 1. The configuration of the device system itself is substantially the same as that in the first embodiment.

FIG. 6 illustrates as an example a controlling sequence 9a in the above configuration. After the main captured image data is input, at the timing 54, the main image processing is started by using the image data, and also a continuous imaging instruction is transmitted to the imaging device 6 by using a plurality of sub-imaging parameters, which are different from the main imaging parameter. The imaging device 6 performs the sub-imaging while switching the imaging parameters from a timing 63a, accumulates the image data acquired by the sub-imaging in an internal memory or the like, and ends this step at a timing 63f before the main image processing ends. Note that the number of images that can be captured by using the sub-imaging parameters (the number of times imaging is performed) is assumed to be calculated, checked, and stored in advance, from the relationship between the imaging time and the image processing time in the construction of setting for the image processing. As a processing procedure, as in the first embodiment, a priority is put on sending the main image processing results to the control device 1. For example, at a timing 56a after the timing 55 at which all the main image processing results are sent, the image processing device 5 receives (downloads) a group of pieces of sub-captured image data that are acquired by the imaging device 6. The image processing device 5 performs image processing on the group of pieces of sub-captured image data. The image processing is substantially the same as the main image processing that has been performed from the timing 54 to the timing 55. At a timing 57a at which the processing ends, a group of the sub-image processing results may be output by being displayed on the display device 7, for example, in such a manner that the sub-image processing results are synthesized or stored in a data array so that display can be switched. If it is determined that any one of the output sub-image processing results is satisfactory and fall within a predetermined processing result criteria range, at a timing 81a, for example, updating is performed by using the input device 8, for example, by setting, as a new main imaging parameter, the sub-imaging parameter corresponding to the sub-image processing result that is determined to be satisfactory and falls within a predetermined processing result criteria range. If the satisfactory image processing results are not obtained and do not fall within a predetermined processing result criteria range, subsequently, the image processing device 5 waits for a control instruction from the control device 1, for example, and the plurality of sub-imaging parameters may be changed or the same sub-imaging parameters may be used in a similar manner in the next and subsequent image processing.

As described above, according to the second embodiment, the main imaging is performed by using the predetermined main imaging parameter, the main image processing is performed, the main image processing results are sent to the control device 1, and an imaging instruction is transmitted to the imaging device in order to perform imaging by using the plurality of sub-imaging parameters during the main image processing. The results of the sub-image processing corresponding to each of sub-imaging parameters are extracted, and if any one of the processing results is satisfactory and falls within a predetermined processing result criteria range, the main imaging parameter can be updated with a corresponding one of the sub-imaging parameters. Therefore, it is possible to suppress adverse effects, such as stopping the operation of the devices and causing a malfunction or damage, as a result of false main image processing due to misadjustment of the imaging parameter.

The imaging parameter can be checked and adjusted in order to obtain an appropriate imaging parameter. Furthermore, during the main image processing, the pieces of sub-captured image data can be acquired by using the plurality of sub-imaging parameters, and the plurality of sub-image processing results can be extracted to be checked. Therefore, a more appropriate imaging parameter can be detected in a short time.

Figure 7:
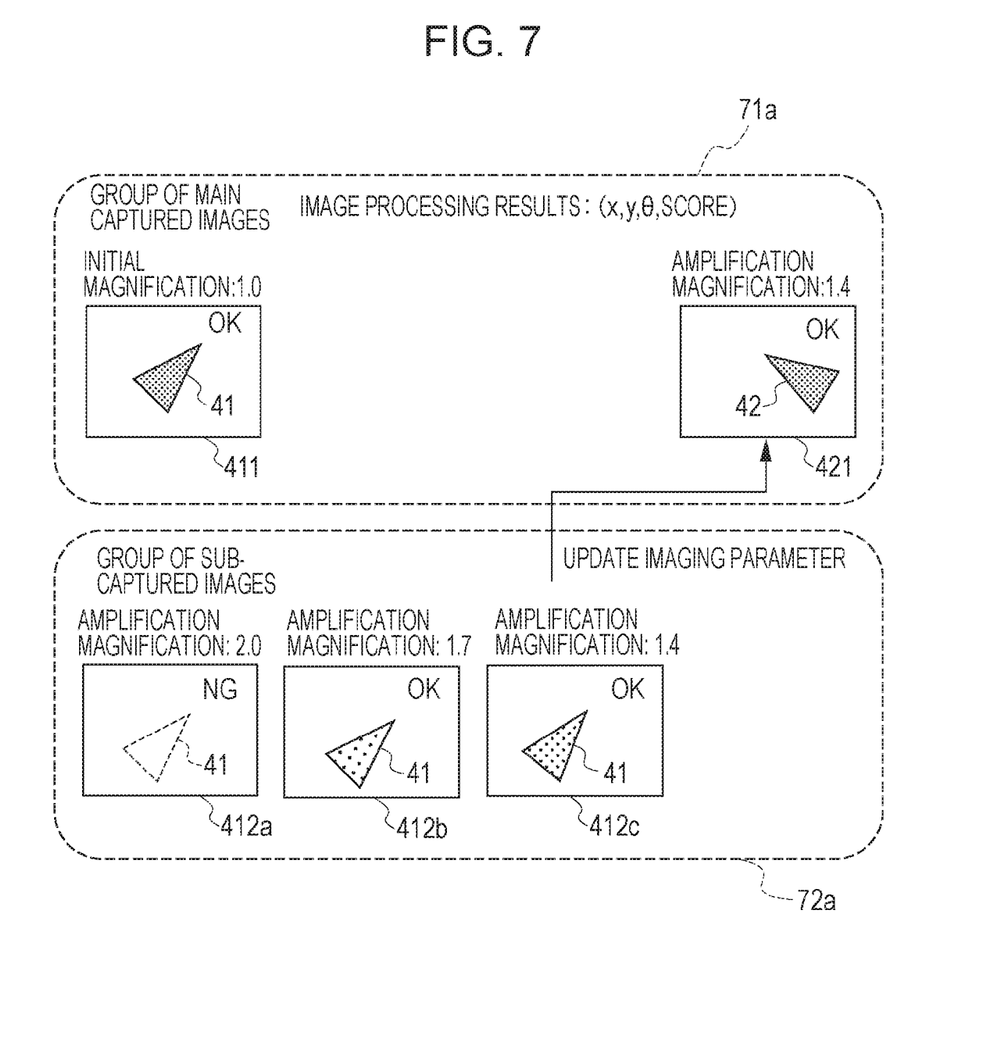
FIG. 7 illustrates operation of an image processing device performed when an imaging parameter is adjusted in the second embodiment of the present disclosure.
Figure 8:
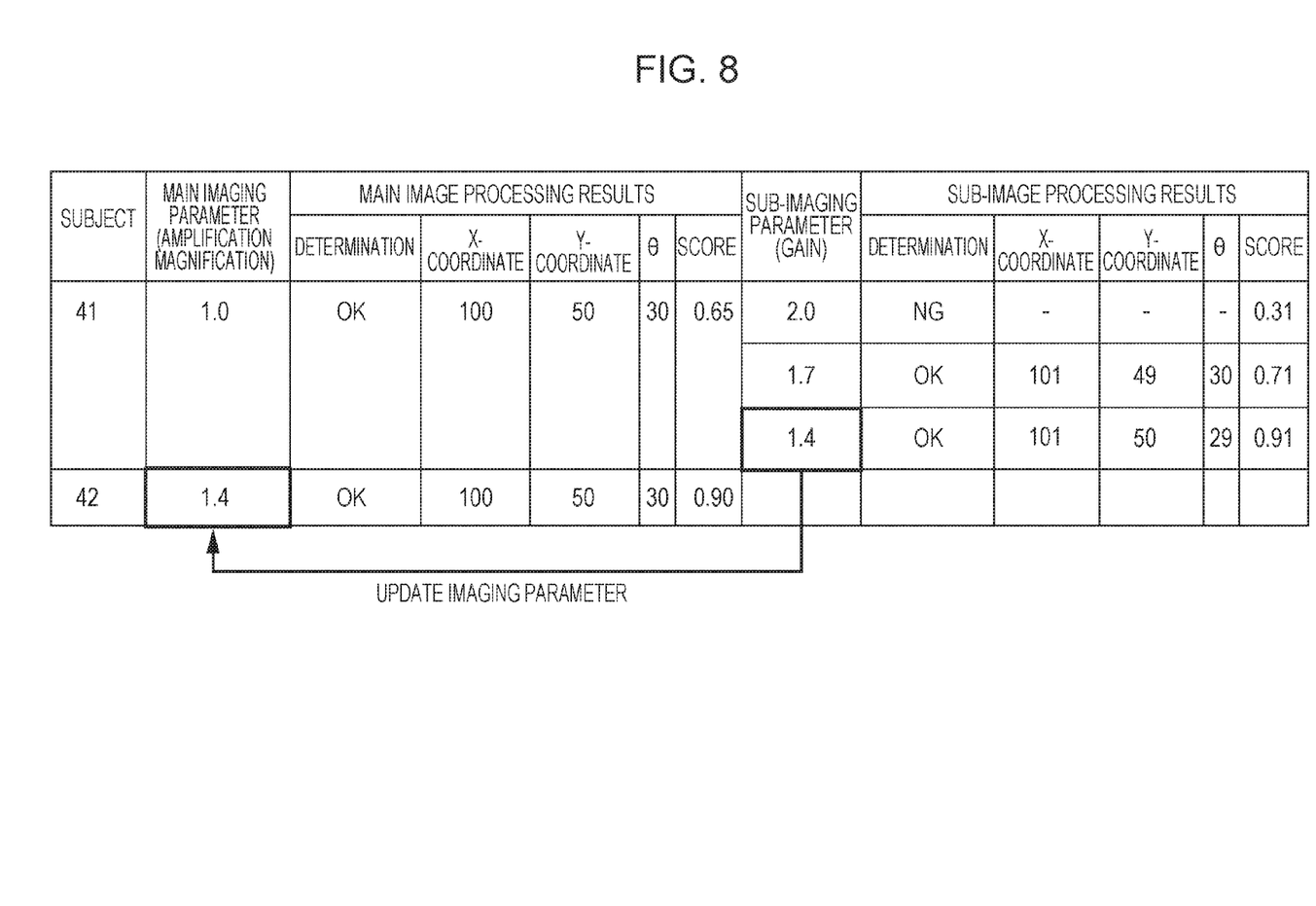
FIG. 8 illustrates image processing results and updating of an imaging parameter in order to adjust the imaging parameter in the second embodiment of the present disclosure.

FIG. 7 is a conceptual drawing related to an operation of adjusting the imaging parameter. FIG. 8 illustrates, by using example numerical values, relationships between the image processing results and the updating of the imaging parameter. Advantageous effects of the second embodiment will be described with reference to FIGS. 7 and 8.

As in FIG. 4, the example in FIG. 7 is a form of a device system in which the control device 1 conveys some objects by using the conveying device 2. In this device system, in response to a predetermined number of the objects being conveyed, a control instruction for image processing is transmitted to the image processing device 5. The details of the image processing are substantially the same as those in the first embodiment unless otherwise specified. The number of images that can be captured by the sub-imaging during the main image processing is assumed to be three (it is possible to perform sub-imaging three times) as in the above case. A user can set all the sub-imaging parameters through the input device 8; in this example, the user checks the previous image processing results, for example, and inputs amplification magnifications of 2.0, 1.7, and 1.4 for checking. Upon receiving the control instruction, the image processing device 5 transmits an imaging instruction to the imaging device 6, and the imaging device 6 captures an image of the placed object 41 by using the predetermined main imaging parameter in order to obtain a captured image 411. Image processing is performed by using this captured image, and the image processing results are obtained as illustrated in FIG. 8 (the image processing results may include determination results, positions, phases, and matching scores). Then, the image processing results are sent to the control device 1. An image 421 is obtained by capturing an image of the object 42.

Referring to FIG. 8, the object 41 has a matching score of 0.65; thus, the main image processing is successful, but the target value (0.8) is not obtained. When the user checks the main captured image 411 and the processing results on, for example, a screen 71a displayed by the display device 7, the user will understand that the image of the object 41 and the previous images were not captured with appropriate brightness and will recognize the necessity to adjust the imaging parameter. Accordingly, the user checks, as described above, the sub-imaging parameters (the amplification magnifications of the initial gains) of 2.0, 1.7, and 1.4. In this case, pieces of sub-captured image data are acquired by using the respective sub-imaging parameters during the main image processing, and sub-captured images 412a, 412b, and 412c are input into the image processing program 531. In addition, the sub-image processing results are displayed on a screen 72a as in the main image processing.

In this example, the sub-captured images obtained by imaging by using three different sub-imaging parameters produce the following processing results as illustrated in FIG. 8. With the sub-imaging parameter of the amplification magnification of 2.0, the image processing is unsuccessful. With the sub-imaging parameter of the amplification magnification of 1.7, the image processing is successful but the target value (0.8) is not obtained. With the sub-imaging parameter of the amplification magnification of 1.4, the image processing is successful, and the score exceeds the target value (0.8). Accordingly, the main imaging parameter is updated with this amplification magnification. Upon receiving the processing results, the control device 1 transmits a control instruction to the image processing device 5 such that the object 41 is further conveyed and then the object 42 is measured. The image processing device 5 captures an image with the main imaging parameter of last-updated amplification magnification of 1.4, and accordingly, the main captured image 421 is obtained. This main image processing is successful, and the pattern matching score of the object 42 is substantially the same (0.9) as the last-checked score. In this manner, in the second embodiment, the images can be captured by using the plurality of sub-imaging parameters, which are different from the main imaging parameter, during the main image processing, and the respective sub-image processing results can be extracted, compared, and checked.

Accordingly, adverse effects are suppressed, such as stopping the operation of the devices and causing a malfunction or damage as a result of false main image processing due to misadjustment of the imaging parameter. Therefore, the imaging parameter can be checked and adjusted in order to obtain an appropriate imaging parameter, and also a plurality of imaging parameters can be checked. This results in detection of the appropriate imaging parameter in a shorter time.

With the image processing method according to an embodiment of the present disclosure, even during the operation of the devices, an image of an object can be captured by using the predetermined main imaging parameter, the main image data can be acquired, the main image processing can be performed, and the processing results can be sent to an external device. During the execution of the main image processing, an image can be captured by using the sub-imaging parameter, which is different from the main imaging parameter, sub-captured image data can be acquired at an arbitrary timing, and the sub-image processing may be performed. The processing results can be extracted, and depending on the extracted results, the main imaging parameter can be updated with the sub-imaging parameter. Accordingly, instead of directly updating the main imaging parameter, the image processing results can be separately extracted and checked by using at least one different imaging parameter. Thus, the imaging parameter can be checked and adjusted in order to obtain the appropriate imaging parameter without producing the adverse effects, such as stopping the operation of the devices and causing a malfunction as a result of false main image processing due to misadjustment of the imaging parameter.

The device system is formed in the above manner, including the control device, the image processing device, and the imaging device. The device system also includes a program that executes steps in a control unit of the device system. That is, it is possible to provide an excellent device system having a high operating efficiency of devices.

The user may form the device system in accordance with the usage, such as further providing a robot arm as illustrated in FIG. 1A.

As described above, the second embodiment has a feature in that the sub-captured image includes a group of sub-captured images acquired by capturing a plurality of images of the object by using the mutually different sub-imaging parameters.

According to one or more embodiments of the present disclosure, the imaging parameter can be adjusted appropriately, and a decrease in the operating efficiency of devices can be suppressed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-023664, filed Feb. 9, 2015, which is hereby incorporated by reference herein in its entirety.

What is claimed is:

1. An image processing method for performing image processing on a captured image by using a control device, an image processing device, and an imaging device that are capable of communication with each other, the method comprising:
    acquiring a main captured image by capturing, by using the imaging device, an image of an object by using a predetermined main imaging parameter, and performing, by using the image processing device, main image processing on the main captured image;
    transmitting, to the control device, a result of the main image processing performed on the main captured image;
    acquiring a sub-captured image by capturing, by using the imaging device, an image of the object by using a sub-imaging parameter, and performing, by using the image processing device, sub-image processing on the sub-captured image; and
    comparing the result of the main image processing performed on the main captured image with a result of the sub-image processing performed on the sub-captured image and, if the result of the sub-image processing falls within a predetermined processing result criteria range, performing updating by setting the sub-imaging parameter as a new main imaging parameter, and if the result of the sub-image processing does not fall within the predetermined processing result criteria range, refraining from updating.

2. The image processing method according to claim 1, wherein after the main captured image is transmitted from the imaging device to the image processing device, the image of the object is captured by using the sub-imaging parameter.

3. The image processing method according to claim 2, wherein concurrently with the main image processing on the main captured image, the image of the object is captured by using the sub-imaging parameter.

4. The image processing method according to claim 2, wherein after the main image processing performed on the main captured image is completed and the result of the main image processing is transmitted to the control device, the sub-captured image is transmitted from the imaging device to the image processing device.

5. The image processing method according to claim 1, wherein the sub-captured image includes a group of sub-captured images acquired by capturing a plurality of images of the object by using mutually different sub-imaging parameters.

6. A device system including a control device, an image processing device, and an imaging device, the system comprising:

a control unit storing a non-transitory program executing an image processing method for performing image processing on a captured image by using the control device, the image processing device, and the imaging device that are capable of communication with each other, the method comprising:

acquiring a main captured image by capturing, by using the imaging device, an image of an object by using a predetermined main imaging parameter, and performing, by using the image processing device, main image processing on the main captured image;

transmitting, to the control device, a result of the main image processing performed on the main captured image;

acquiring a sub-captured image by capturing, by using the imaging device, an image of the object by using a sub-imaging parameter, and performing, by using the image processing device, sub-image processing on the sub-captured image; and comparing the result of the main image processing performed on the main captured image with a result of the sub-image processing performed on the sub-captured image and, if the result of the sub-image processing falls within a predetermined processing result criteria range, performing updating by setting the sub-imaging parameter as a new main imaging parameter, and if the result of the sub-image processing does not fall within the predetermined processing result criteria range, refraining from updating.

7. The device system according to claim 6, further comprising:

a robot arm.

* * * * *